Aug. 15, 1967   C. L. BURGESS   3,336,047
CHILD'S VEHICLE PROPELLED BY HAND LEVER
Filed June 9, 1965   3 Sheets-Sheet 1
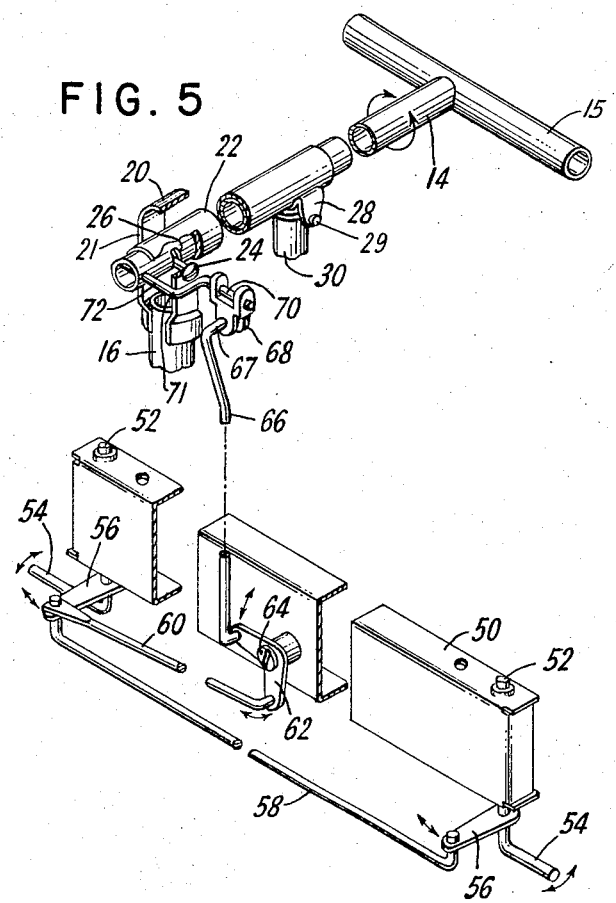
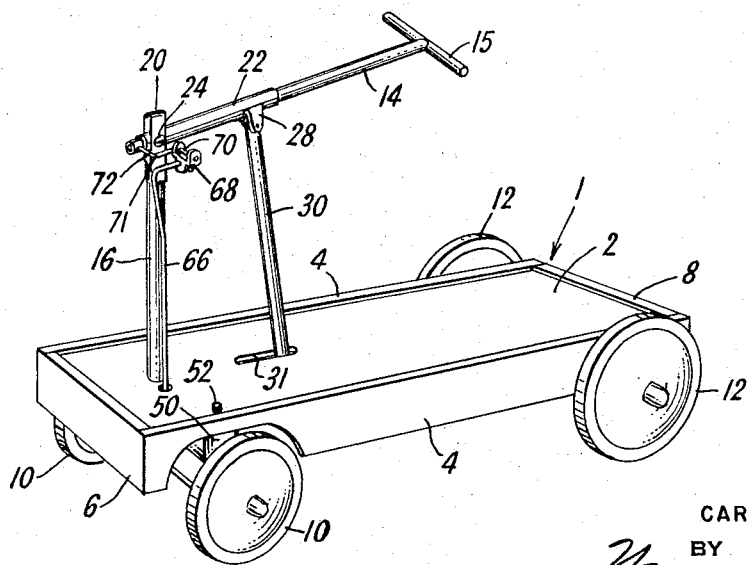
INVENTOR
CARTER L. BURGESS
BY
ATTORNEY

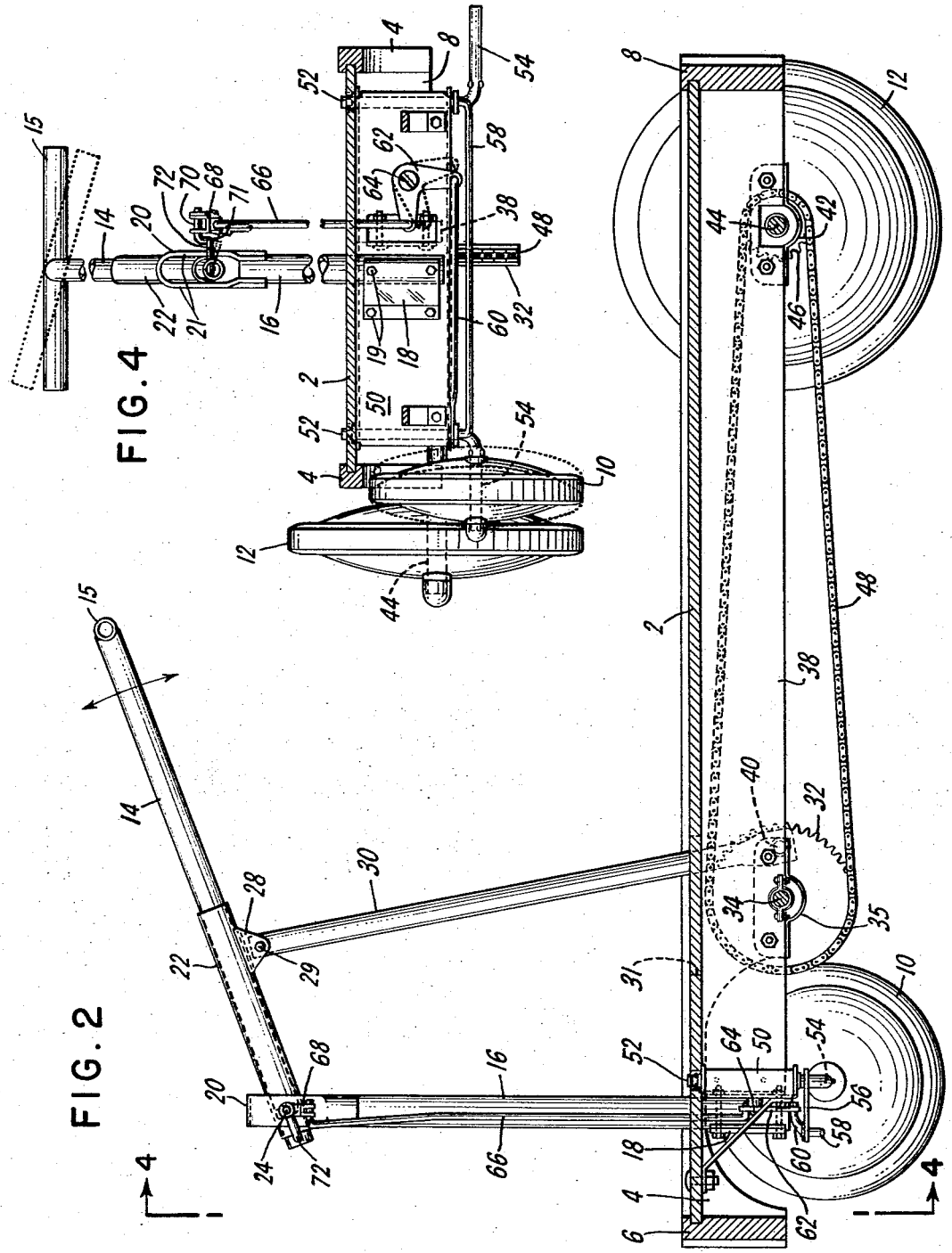

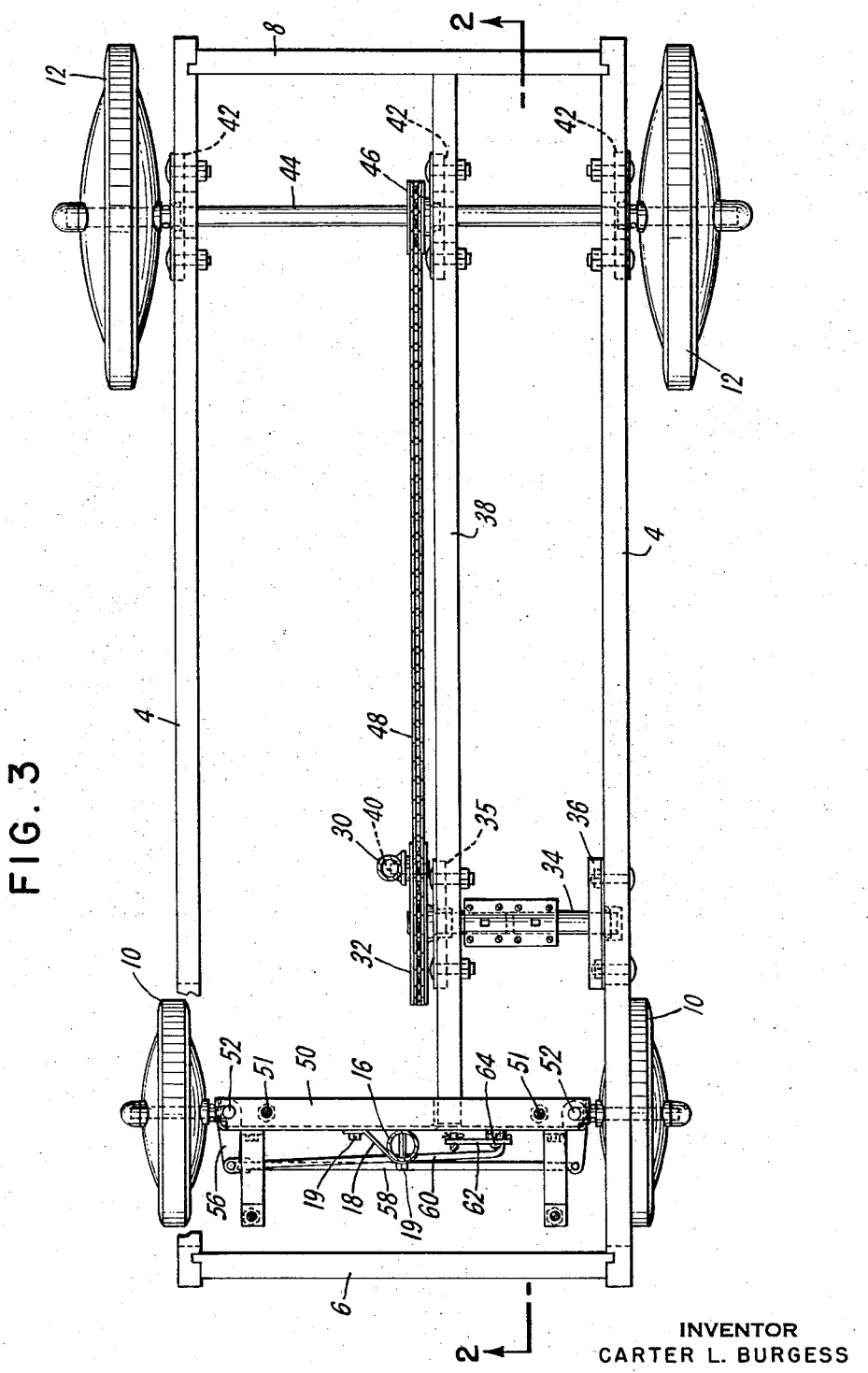

United States Patent Office 3,336,047
Patented Aug. 15, 1967

3,336,047
CHILD'S VEHICLE PROPELLED BY HAND LEVER
Carter L. Burgess, Pelham Manor, N.Y., assignor to American Machine & Foundry Company, a corporation of New Jersey
Filed June 9, 1965, Ser. No. 462,485
5 Claims. (Cl. 280—240)

This invention relates to children's vehicles and, more particularly, to an improved hand pumped vehicle which can be conveniently steered by hand when the rider is in standing position.

Children's hand pumped wheeled vehicles have long been known but have heretofore had the disadvantage that steering could not be accomplished conveniently by a rider in standing position. Recognizing this disadvantage, prior-art workers have equipped such vehicles with a seat and provided a steerable front wheel assembly which could be manipulated by foot action so long as the rider is seated. However, since one of the main attractions offered by a hand pumped vehicle is that the child can stand while operating the drive means, such prior-art devices have not been entirely satisfactory, and children's vehicles of this type have lost popularity over the years.

It is accordingly an object of this invention to provide a children's vehicle of the hand pumped type which the rider can steer conveniently by hand while in a standing position.

Another object is to devise such a vehicle wherein the same member which the rider grasps to pump the vehicle can also be manipulated to steer the vehicle.

A further object is to provide a children's vehicle equipped with a single member which can be moved upwardly and downwardly to provide driving power and which can also be turned to accomplish steering.

In order that the manner in which these and other objects are achieved in accordance with the invention can be understood in detail, one particularly advantageous embodiment thereof will be described with reference to the accompanying drawings, which form a part of this specification, and wherein:

FIGURE 1 is a perspective view of a children's vehicle constructed in accordance with the invention;

FIGURE 2 is a longitudinal sectional view taken on line 2—2, FIGURE 3;

FIGURE 3 is a top plan view of the vehicle with portions thereof removed for clarity of illustration;

FIGURE 4 is a transverse sectional view taken on line 4—4, FIGURE 2; and

FIGURE 5 is a fragmentary perspective view illustrating the steering mechanism of the vehicle.

Turning now to the drawings in detail, the illustrated embodiment of the invention comprises a body indicated generally at 1, FIGURE 1, the body being in the nature of a platform defined by a flat top member 2, in the form of an elongated rectangle, side members 4, a transverse front end member 6, and a transverse rear end member 8. Members 2, 4, 6 and 8 are of any suitable substantially rigid material and are fixedly interconnected in any conventional fashion to provide a structure adequately strong to support the weight of the rider under conditions of turning as well as under conditions of straight line travel. The body 1 is equipped with a pair of steerable front wheels 10 and a pair of powered rear wheels 12, the wheels being mounted as hereinafter described.

A cross-beam 50 is located between the front wheels and beneath member 2. Advantageously, cross-beam 50 is of metal stock of U-shaped transverse cross-section, one side web of the beam being in face-to-face contact with the lower surface of member 2, and the beam being rigidly secured to member 2, as by bolts or other fasteners 51, FIGURE 3. As best seen in FIGURES 3 and 4, the length of cross-beam 50 is less than the transverse space between side members 4 and the cross-beam is centered between the two side members so that each end of the cross-beam is disposed adjacent a different one of the side members 4.

In front of cross-beam 50, and at a point centered between side members 4, the top member 2 is provided with an opening through which an upright support member or stanchion 16 extends. Member 16 is of straight tubular metal stock and is rigidly mounted on cross-beam 50 by bracket 18 and fasteners 19, FIGURES 3 and 4. A yoke 20, FIGURES 1, 2 and 5, is rigidly secured to the upper end of member 16 to accommodate the forward end of a lever member 22. The yoke has vertical arm portions 21 spaced apart transversely of body 1 and the lever is mounted on the yoke for pivotal movement about a horizontal transverse axis by means of a bolt 24 which extends through aligned openings in arm portions 21 and and lever member 22. Since the pivotal axis defined by bolt 24 is horizontal and parallel to the body end members 6 and 8, lever member 22 is constrained to swing in a vertical plane which extends longitudinally of the vehicle.

Lever member 22 is of straight tubular metal stock and rotatably slidably accommodates the forward end portion of a second lever member 14 which is also of straight tubular metal stock but of smaller diameter than lever member 22. As seen in FIGURE 5, member 14 is provided with two transversely aligned circumferentially extending slots 26 through which the bolt 24 freely extends. Since slots 26 are long in comparison to the diameter of the shank of bolt 24, and since member 14 is slidable within member 22, member 14 is free to turn about its longitudinal axis through an angular distance determined by the length of slots 26. However, since member 22 is of significant length, members 14 and 22 must move together to swing about the axis defined by bolt 24. To allow easy manipulation of lever member 14 alone in rotation and of members 14 and 22 together in pivoting, a transversely extending handle bar 15 is fixed to the rear end of member 14.

A bracket 28 is fixedly attached to lever member 22 near the rear end thereof and depends therefrom. A tubular shaft 30 has its upper end pivotally connected to bracket 28, as by a bolt 29 which defines a pivotal axis parallel to that established by bolt 24. Shaft 30 extends downwardly through a suitable opening 31 in top member 2 of the body and terminates near a longitudinally extending beam 38 which has its ends secured respectively to cross-beam 50 and rear end member 8. A sprocket wheel 32 is provided, being mounted for rotation about the transverse axis defined by shaft 34. Shaft 34 is rotatably mounted by means of aligned bearings 35 and 36 secured respectively to beam 38 and the adjacent member 4. The lower end of shaft 30 is connected to a crank pin 40 carried by the sprocket wheel 32. Accordingly, when the combination of lever members 14 and 22 is pivoted upwardly and downwardly about the axis defined by bolt 24, rotary movement is imparted to sprocket wheel 32 via shaft 30 and crank pin 40.

The rear wheels 12 are fixed to an axle 44 journaled in bearings 42 mounted on members 4 and 38. A sprocket wheel 46, lying in the same plane as sprocket wheel 32, is fixed to axle 44. A drive chain 48 is operatively engaged about the two sprocket wheels so that rotary movement of sprocket wheel 32 is converted into rotation of wheels 12 to drive the vehicle forwardly or rearwardly, depending on the initial position of crank pin 40 and the initial direction of pivotal movement of lever members 22 and 14.

The forward end of lever member 14 projects beyond the forward end of member 22, as best seen in FIGURE 5, and is provided with transversely aligned openings which freely receive one end portion 72 of a crank member 71. The other end portion 70 of crank member 71 extends freely through transversely aligned openings in the upwardly projecting ears of a transfer member 68. The downwardly projecting ears of member 68 have openings which are aligned longitudinally of the vehicle and which receive the rearwardly projecting upper end portion 67 of a link 66. The lower end portion of link 66 is also bent rearwardly and is journaled in one arm of a bell crank 62 which is mounted on crossbeam 50 for pivotal movement about the longitudinally extending axis defined by mounting bolt 64.

Each front wheel 10 is rotatably carried by a stub axle 54 which is integral with a king pin 52, each king pin 52 being journaled in a different end portion of the crossbeam 50. Lever arms 56 are secured to and project from king pins 52, and a tie rod 58 has its ends each pivotally connected to the free end of a different one of the lever arms 56. A link 60 has its ends pivotally connected respectively to the remaining arm of bell crank 62 and the free end of one of the lever arms 56.

When lever member 14 is rotated in either direction about its longitudinal axis, a corresponding amount of swinging movement is imparted to crank member 71 and this movement is transferred to bell crank 62 via link 66. The resulting pivotal movement of bell crank 62 is imparted via link 60 to the combination of lever arms 56 and tie rod 58, so that the king pins 52 are turned about their axes and the front wheels 10 are correspondingly turned, to steer the vehicle, as a result of the swing movement of stub axles 54.

Turning of lever member 14 about its longitudinal axis is easily accomplished by turning handle bar 15, and this action is independent of any upward and downward pivotal movement imparted to the combination of lever members 14 and 22. The steering gear mechanism extending from crank member 71 to the front wheels 10 is operationally independent of the drive means, since crank member 71 serves essentially as a lost motion connection with respect to pivotal movement of member 14 about the axis defined by bolt 24. Hence, if lever member 14 is not turned about its longitudinal axis, the angular positions of the stub shafts 54 remain unchanged even though the handle bar is being vigorously pumped to drive the vehicle. On the other hand, manipulation of the handle bar to turn lever member 14 about its longitudinal axis is as effective to turn front wheels 10 for steering when the handle bar is being pumped to drive the vehicle as it is when no pumping is being done.

In this embodiment of the invention, the top member 2 of body 1 provides a broad flat surface, rearwardly of handle bar 15, upon which the rider can stand, and the support 16 and shaft 30 are made sufficiently long to assure that the handle bar will be disposed in positions convenient to the standing rider.

It is to be noted that bolt 24, serving as a pivot member positioned by the combination of member 16 and yoke 20, constrains the combination of lever members 14 and 22 to pivotal movement upwardly and downwardly in a vertical plane which extends lengthwise of the vehicle. Since lever member 22 is tubular and of circular transverse cross-section, and since the outer surface of lever member 14 is cylindrical and closely embraced by member 22, member 14 is constrained by member 22 to turn about the common longitudinal axis of the two lever members.

Though one particularly advantageous embodiment of the invention has been illustrated and described, it will be understood by those skilled in the art that various changes and modifications can be made therein without departing from the scope of the invention as defined in the appended claims.

What is claimed is:

1. In a vehicle of the type described, the combination of a wheeled body structure providing a supporting area on which the rider can stand; mounting means rigidly carried by said body structure and extending upwardly therefrom in a location disposed forwardly of said supporting area; lever means comprising a straight tubular lever member mounted on said mounting means for pivotal movement about an axis transverse to the vehicle and a second lever member extending through and slidably embraced by said tubular lever member, said second lever member being longer than said tubular lever member and having a front end portion projecting forwardly from said tubular lever member and a rear end portion projecting rearwardly from said tubular lever member, said second lever member being free to turn about its longitudinal axis within said tubular lever member; drive means interconnecting said tubular lever member and the driven wheels of the vehicle and operative to convert pivotal movement of said tubular lever member into rotary movement of the driven wheels; and steering means carried by said body structure and including a link extending upwardly to a position adjacent said front end portion of said second lever member, and means interconnecting the upper end of said link and said front end portion of said second lever member, said steering means being operative to convert turning movement of said second lever member about itss longitudinal axis into steering movement of steerable wheels of the vehicle.

2. In a vehicle of the type described, the combination of a wheeled body structure; drive means carried by said body structure for driving at least one wheel of the vehicle; steering means carried by said body structure for imparting steering movement to at least one wheel of the vehicle; an upright support fixed rigidly to said body structure and extending upwardly therefrom in a forward location thereon; a straight tubular lever member of cylindrical transverse cross-section; a pivot member extending transversely through one end portion of said tubular lever member; means mounting said pivot member on said support with said pivot member defining a pivoted axis for said lever member which extends horizontally and transverse to the vehicle, said tubular lever member extending generally rearwardly from said pivot member; a second lever member extending through said tubular lever member and having a portion having a cylindrical outer surface slidably embraced by said tubular lever member, said second lever member having transverse passage means through which said pivot member extends and said passage means allowing said second lever member to turn about its longitudinal axis independently of said tubular lever member, said second lever member having a front end portion projecting forwardly from said tubular lever member and a rear end portion projecting rearwardly from said tubular lever member; said drive means including a generally upwardly extending member pivotally connected to said tubular lever member at a point spaced from said pivot member; and means connecting said front end portion of said second lever member to said steering means to operate said steering means in response to turning of said second lever member about its longitudinal axis.

3. A vehicle according to claim 2, wherein said means connecting said front end portion of said second lever member to said steering means comprises a crank member having one arm portion extending transversely through said front end portion of said second lever member and journaled therein; a transfer member, said crank member extending generally radially from said second lever member and including an outer arm portion journaled in said transfer member; and a link extending upwardly from said body structure and having a horizontal upper end portion which projects longitudinally of the vehicle and is journaled in said transfer member; said crank member being operative as a lost motion connection preventing pivotal motion of said lever members about said pivot member from being imparted to said link.

4. In a vehicle of the type described, the combination of a body structure; wheels operatively mounted on said body structure for supporting the same and including at least one driven wheel and at least one steerable wheel; manually operated means comprising a first member mounted on said body structure for upward and downward movement, said first member comprising a straight tubular lever member of circular transverse cross-section and mounted for pivotal movement about an axis extending transversely of said body structure, said first member extending rearwardly from its axis of pivotal movement; and a second member carried by said first member for movement therewith, said second member comprising a straight lever member extending through and slidably embraced by said first member including a front end portion projecting forwardly beyond said first member and being mounted for turning movement independently of said first member about an axis disposed in a vertical plane extending at least generally lengthwise of the vehicle; drive means interconnecting said first member and said driven wheel and operative to convert upward and downward movement of said first member into rotation of said driven wheel; and steering means interconnecting said second member and said steerable wheel and operative to convert turning movement of said second member about said axis into steering movement of said steerable wheel, said steering means comprising crank means connecting said steering means to said front end portion of said second member, and said crank means serving as a lost motion connection rendering said steering means independent of upward and downward pivotal movement of said first and second members about said pivotal axis.

5. A child's vehicle comprising, a body structure, wheels operatively mounted on said body structure for supporting the same and including at least one driven wheel and at least one steerable wheel, an upwardly extending member mounted on said body structure, drive means comprising a first member pivotally mounted to the upwardly extending member for upward and downward movement, a second handle member carried by the first member and having an end extending forwardly of said first member and adapted for turning movement independent of the first member, a third member pinned at one end to said first member for upward and downward movement in response to movement of said first member and coupled at the other end to the driven wheel for imparting driving motion thereto, and steering means interconnecting said end of said second member and said steerable wheel and operative to convert turning movement of first member into steering movement of said steerable wheel.

References Cited

UNITED STATES PATENTS

| | | | |
|---|---|---|---|
| 941,121 | 11/1909 | Worthington | 280—240 |
| 1,536,788 | 5/1925 | Grady | 280—240 |
| 1,609,173 | 11/1926 | Kraner | 280—240 |
| 2,884,259 | 4/1959 | Snodgrass | 280—240 X |

KENNETH H. BETTS, *Primary Examiner.*